United States Patent Office 3,433,827
Patented Mar. 18, 1969

3,433,827
CALCIUM ASPIRIN DIALKYLSULFOXIDES
Alexander Galat, 126 Buckingham Road,
Yonkers, N.Y. 10701
No Drawing. Filed Mar. 13, 1967, Ser. No. 622,394
U.S. Cl. 260—480    4 Claims
Int. Cl. C07c 69/86

ABSTRACT OF THE DISCLOSURE

Calcium acetylsalicylate ("soluble aspirin") and a lower dialkylsulfoxide react in organic medium to precipitate a double salt of the two in 1:1 molecular ratio. The preferred compound, calcium aspirin dimethylsulfoxide, is stable on storage, highly soluble in water, neutral in reaction and exihibts a high analgesic and anti-inflammatory action.

Ever since the discovery of the valuable analgesic and antipyretic properties of aspirin (acetylsalicylic acid) some sixty years ago, continuous attempts have been made to prepare a stable, water soluble, neutral derivative of this compound. Such a derivative would offer a number of important advantages over aspirin itself: it could be given in solution form to patients unable or unwilling to swallow tablets, it would be more readily absorbed, it would be expected to reduce the incidence of gastrointestinal disorders resulting from the acid nature and low solubility (1 g./300 ml. water) of aspirin, etectera.

One of the most promising compounds prepared with this object in view was calcium acetylsalicylate. It is neutral, readily soluble in water (1 g./6 ml.), gives a tasteless solution and a large number of clinical studies demonstrated that it was a well tolerated compound. In addition, analgesia with calcium acetylsalicylate was shown to be more potent, more prolonged and faster in onset than with aspirin itself. Unfortunately, calcium acetylsalicylate also proved to be a very unstable compound. Apparently, neutralization of the carboxyl group in acetylsalicylic acid makes the acetyl group extraordinarily sensitive to hydroylsis and as a result this salt rapidly decomposes on storage with the formation of various breakdown products such as salicylic acid, acetic acid, calcium salicylate and others. It has been reported to decompose completely in two weeks at 37° C. which is equivalent to storage for less than one year at room temperature.

In addition, the storage behavior of calcium acetylsalicylate is unpredictable and erratic. Different batches of the compound, all prepared by the same method, vary in stability, some decomposing after several weeks, others after several months, while still others remain in apparently good condition for even longer periods only to begin to decompose suddenly at a very rapid rate. This unpredictable behavior may explain the contradictory claims regarding the stability of calcium acetylsalicylate made by various investigators during the past sixty years. In any event, in spite of the many efforts to prepare this salt in stable form, sufficient stability has never been achieved and this drug, with its very valuable pharmacological properties, has never been used to any appreciable extent in medical practice.

Certain dialkylsulfoxides also possess valuable pharmacological properties but are limited in their use by various disadvantages. Thus, the most promising member of the group, dimethylsulfoxide, has very desirable analgesic, anti-inflammatory, penetrating and potentiating effects. Unfortunately, it is a hygroscopic liquid and therefore cannot be used in the most convenient dosage forms such as tablets, powders, and the like.

One object of this invention is to provide stable, neutral, water soluble derivatives of aspirin.

Another object of this invention is to provide stable, neutral, water soluble derivatives of calcium acetylsalicylate.

Still another object of this invention is to provide a solid, nonhygroscopic form of dialkylsulfoxides.

A further object of this invention is to provide calcium acetylsalicylate dialkylsulfoxides.

Additional objects of this invention will become apparent as the description thereof proceeds.

I have discovered that the objects of this invention are accomplished by compounds of the following structure:

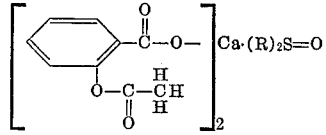

where R is a lower alkyl radical.

The compounds of my invention may be prepared by stirring together calcium acetylsalicylate and a dialkylsulfoxide, such as dimethylsulfoxide, diethylsulfoxide, dipropylsulfoxide, etcetera, preferably in the presence of an organic solvent as set forth in the following illustrative but non-limiting example.

EXAMPLE

Ten parts by weight of calcium acetylsalicylate hydrate and twenty parts by volume of dimethylsulfoxide (d. 1.1) were stirred together until the solid went into solution following which the mixture was treated with one hundred parts by volume of isopropyl alcohol. The mixture was cooled to 10° C. and stirred until crystallization of the resulting compound was complete. The crystals were filtered, washed with isopropyl alcohol and dried at about 50° C. The yield was 87.5% of theory.

The resulting calcium acetylsalicylate dimethylsulfoxide is a white, crystalline, nonhygroscopic compound.

*Analysis.*—Calculated for $C_{20}H_{20}O_9SCa$: Aspirin assay, 75.7%, sulfur, 6.7%. Found: aspirin assay, 75.7%, sulfur, 6.5%.

Melting point: 165–175° C.; decomposes at about 185–190° C. with evolution of bubbles.

Calcium acetylsalicylate dimethylsulfoxide is readily soluble in water, the resulting solution being practically tasteless and is neutral in reaction.

The compounds of my invention exhibit a remarkably high degree of stability. Accelerated aging tests were run by maintaining samples of various calcium acetylsalicylates in a constant temperature oven at 50° C. (Five days at 50° C. are approximately equivalent to storage for one year at room temperature.) The materials for these stability studies were prepared as follows: calcium acetylsalicylate·3½H₂O in accordance with U.S. Patent 2,003,-374; calcium acetylsalicylate dihydrate in accordance with Ann. Chim. 406, 244, 1914, and calcium acetylsalicylate dimethylsulfoxide prepared in accordance with the example, ante.

At intervals portions of these samples were removed from the oven and the salicylic acid contents thereof determined calorimetrically, using the ferric salt method. (Since one product of decomposition of the acetylsalicylate ion is the salicylate ion, determination of the latter measures the extent of decomposition of the acetylsalicylate.)

The results of these tests are given in the following tabulation. Percentage decomposition figures in this table have been rounded off to the nearest significant figure. Thus, 0% decomposition does not necessarily mean complete absence of decomposition but rather less than 0.5% decomposition. Similarly, an extent of decomposition within the range 37–38% to 42–43% is listed in the table as 40% decomposition.

It is seen that the typical behavior of calcium acetylsalicylates is characterized by an extensive decomposition within ten days at 50° C. (which is equivalent to less than two years storage at room temperature) and by complete decomposition after only fifteen days. In contrast, the preferred compound of this invention, calcium acetylsalicylate dimethylsulfoxide, shows negligiable decomposition within the same period. This compound can thus be considered infinitely stable for all practical purposes.

TABLE

| Compound | Time, days |  |  |  |  |
|---|---|---|---|---|---|
|  | 1 | 2 | 5 | 10 | 15 |
|  | Percent decomposition at 50° C. |  |  |  |  |
| Calcium acetylsalicylate.3½H₂O | 0 | 0 | 100 | 100 | 100 |
| Calcium acetylsalicylate.2H₂O | 1 | 2 | 5 | 40 | 100 |
| Calcium acetylsalicylate dimethylsulfoxide | 0 | 0 | 0 | 0.5 | 0.5 |

Calcium acetylsalicylate dimethylsulfoxide is the preferred compound of this invention. Higher dialkyl sulfoxides are more costly, less readily available and do not appear to offer any advantages over the dimethyl member of the group.

The remarkable feature of the present invention, as is readily evident, resides not only in the fact that by combining two valuable drugs, such as calcium acetylsalicylate and dimethylsulfoxide, the serious disadvantages of both are unexpectedly completely eliminated and their extensive use thus made practical, but equally by the fact that these two drugs also effectively complement each other's pharmacological effects, thus providing a new group of therapeutic agents with high analgesic and antiinflammatory activity.

Be it remembered that while this invention has been described in connection with specific details and specific embodiments thereof, these details and embodiments are illustrative only and are not to be considered limitations on the spirit and scope of said invention except in so far as these may be incorporated in the appended claims.

I claim:
1. Compounds of the formula

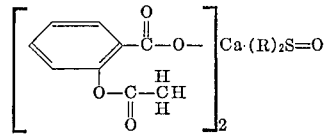

where R is a lower alkyl radical.

2. Compound of claim 1 in which R is the methyl radical.
3. Compound of claim 1 in which R is the ethyl radical.
4. Compound of claim 1 in which R is the propyl radical.

References Cited

UNITED STATES PATENTS 3,382,273   5/1968   Galat _____ 260—480

LORRAINE A. WEINBERGER, *Primary Examiner.*

M. S. BERGER, *Assistant Examiner.*

U.S. Cl. X.R.

260—999